Patented Oct. 13, 1936

2,057,442

UNITED STATES PATENT OFFICE 2,057,442

METHOD OF PRODUCING POROUS SOLID MATTER AND PRODUCTS THEREOF

Franz Mik, Frankfort-on-the-Main, Germany, assignor to Deutsche Gold- und Silber-Scheideanstalt, vormals Roessler, Frankfort-on-the-Main, Germany, a German company No Drawing. Application August 21, 1934, Serial No. 740,848. In Germany August 9, 1933

3 Claims. (Cl. 91—68)

The present invention relates to a method of producing porous, solid matter and more particularly to a method of producing porous solid matter like films, plates, coatings, etc. by means of chlor-rubber and to products thereof.

As is known, the use of chlor-rubber as an admixture for the production of varnishes and of impermeable, protective coatings has been proposed. The parent substances of chlor-rubber, such as caoutchouc, gutta-percha, etc., have given completely coherent and impermeable varnish films and coatings and it was expected that chlor-rubber having approximately the same properties will, likewise, give impermeable films and coatings. In the art of manufacturing varnishes and lacquers, the investigators have directed their attention primarily to substances forming completely impermeable, close and coherent coatings. Although attempts have been made to produce porous solid bodies and particularly permeable films and coatings, none as far as I am aware has been wholly successful and satisfactory in practical use.

I have made the surprising discovery that contrary to all expectations, chlor-rubber does not form a completely impermeable and coherent film, coating or layer and I have found that chlor-rubber produces a structure with fine, microscopic pores.

It is an object of the present invention to provide a method of producing solid matter or bodies which have a fine porosity.

A further object of the invention is to provide films, diaphragms or coatings having substantially uniform porosity and to control the size of pores to those best suited for the purpose.

It is another object of the invention to produce a simple and easily applicable diaphragm for electro-chemical processes, which is not only of uniform and of the most advantageous porosity, but also of chemical stability.

It is also within the contemplation of the present invention to provide water-proof porous impregnations and coatings for materials of all kinds, which due to their porosity do not interfere with the free exchange of air.

Other objects and advantages of the invention will become apparent from the following description of the invention.

Generally speaking, films, plates, coatings, etc. with very fine pores can be easily produced in accordance with the principles of the present invention. In carrying the invention into practice, it has been found preferable to pour a solution of chlor-rubber containing any of its solvents, such as, aromatic hydrocarbons, Tetralin, methylene chloride, mesityl oxide, etc., on a surface, like a film track and to allow the solvent to evaporate. Additional layers can be deposited on the film thus produced whereby it is possible to make plates of any desired thickness.

In case the solutions of chlor-rubber are very concentrated or viscous, it is possible to introduce these viscous or plastic mass into molds, to permit evaporation of part of the solvent, to remove the partly dried solids from the molds, and to allow the solid bodies to dry out completely in the air. Stretching or dilating the film or mass during or after the evaporation of the solvent, changes the porosity thereof and generally increases the size of the pores.

Instead of evaporating the solvent from chlor-rubber the films, plates, etc., may be treated with a precipitation liquid, containing water, alcohols, ether, benzine or similar hydrocarbons, aldehydes, carboxylic acids, phenols, etc. Preferably a precipitation liquid is used which is sufficiently miscible with the solvent of chlor-rubber to be removed.

It has also been discovered that other new and valuable results are obtained by the present invention, if the mass containing chlor-rubber contains also non-solvents of the chlor-rubber in addition to its solvents. For example, chlor-rubber is first dissolved in a solvent such as benzene, methylene chloride, dioxan, and a non-solvent such as alcohol (methanol), benzine, oil of turpentine, deka-hydronaphthalin, etc. is subsequently admixed to the solution in such quantity as can be added without obtaining a precipitate. Generally large pores will be obtained with these solutions. It is of special advantage to choose a non-solvent having a lower vapor pressure, than the solvent simultaneously used, so that the non-solvent will evaporate slower.

The following solutions will give porous films of excellent quality: 20 parts by weight of chlor-rubber are dissolved in 80 parts by weight of methyl acetate of 97.5%. Methanol is added to the well stirred solution which is poured out as a film or treated further by one of the foregoing methods to produce a solid mass. It has been found that the pores are the greater, the more methanol which has been added. Similar excellent qualities are possessed by masses produced by a solution of chlor-rubber in a benzene (solvent) and petroleum ether (non-solvent); or by a solution of chlor-rubber in methylene chloride (solvent) and methanol (non-solvent).

The starting mixtures have not necessarily to be homogeneous. Emulsions containing chlor-rubber—obtainable from homogeneous solutions of chlor-rubber by the addition of generous amounts of a non-solvent,—can be treated in the same way. This can be carried into practice by adding water or hydrous solutions to homogeneous solutions of chlor-rubber while stirring the mixture vigorously.

The porosity of the mass produced by the process of the invention can be also varied by influencing the evaporation of the solvent, by changing the pressure acting on the solution, e. g. by putting the solution in vacuum which, of course, will speed up the evaporation. For the same purpose, solutions of salts in water, methyl alcohol, acetone, etc., may be added to the solutions or emulsions of chlor-rubber. After evaporating the solvent or non-solvent of chlor-rubber, the remaining particles of salt may be dissolved by suitable solvents.

The size of the pores can be reduced in most cases by incorporating non-volatile substances, such as natural resin or artificial resin (glycerine-phthalic acid) into the solutions as emulsions of chlor-rubber. A highly porous, foamy, aerated mass can be obtained by an admixture of condensed colophony—(abietin acid), glycerine esters, or of the glycerine esters of phthalic acid. Addition of uncondensed esters of the above type produces a more or less porous mass according to the quantity of the admixture. Under certain conditions, it is even possible to obtain completely close films by means of a little amount of admixture, or highly porous films by a considerable amount of admixture. The pliability and ductility of the mass can be varied by means of such artificial resins. For instance, a film consisting of 60% chlor-rubber and 40% non-condensed linseed oil—phthalic acid-glyceride is highly porous and ductile, whereas a film containing only 5–10% non-condensed linseed oil—phthalic acid—glyceride is hard and brittle and has fine pores. Even approximately impervious films can be produced by means of resins of appropriate composition.

The present process is of considerable advantage, if a film, or a mass of uniform and definite porosity is to be produced in a simple way. Films of this type are excellently suited as diaphragms for primary batteries or electrolytic processes, not only because of their uniform porosity and chemical stability, but also due to the extreme simplicity of manufacture. For example, in the quantity production of anodes for dry batteries by the conventional process the anodes are made on a production line up to the operation of putting on the little cloth sacks on the anodes, around the depolarizer; an operation which has to be performed by hand. According to the present invention, this operation may be carried out on the production line, simply by dipping the carbon sticks already surrounded with the depolarizer in one of the above-mentioned solutions of chlor-rubber. After evaporation of the solvent remains the porous rubber film; which uniformly covers the complete electrode. Since such diaphragms can be made very thin, the new process is very advantageous with regard to its space requirements which, of course, is a very important consideration with dry batteries.

To produce larger diaphragms such as the ones used in technical electrolysis, either films strengthened by repeated deposits can be made, or a suitable support, e. g. asbestos cloth can be thoroughly impregnated by one of the above-mentioned solutions. Diaphragms of this kind are not only very easy to make, but they can also be easily reactivated, if necessary, by dissolving or depositing some of the active material.

In some instances, it is of advantage in primary batteries and in electrolytic processes to use porous electrodes which are impregnated with suitable metals. Especially in primary batteries this has the object to depolarize the electrodes saturated with hydrogen by means of the atmospheric oxygen. Such electrodes have also the advantage of responding rather quickly to the potential of the gases they are in contact with. (Oxyhydrogen gas cell). Electrodes of this type have been used with success to combining catalytically or in statu nascendi gases (hydrogen) produced electrically. (Formation of formic acid, ammonia or hydrogen superoxide.) Heretofore the manufacture of such electrodes was connected with considerable difficulties, but now it can be easily carried out by the present invention, by adding the necessary substances, e. g. palladium black, salts of platinum or copper, etc., to the above-mentioned solutions or emulsions of chlor-rubber, and making plates, tubes or bowls out of this mixture, which can be used for electrodes either as they are, or after reducing the metallic salts.

The present invention means a considerable improvement in the art of electro-osmosis, where such uniformly porous diaphragms are of great importance. In the production of ultrafilters the new materials described herein have considerable advantages over the collodion heretofore used, because the porosity of the new films can be varied within wide limits by the suitable choice of the composition of the starting materials.

Since chlor-rubber is of a hydrophobic nature, the new materials can be advantageously used for water-proofing materials and textiles of all kinds, (raincoats, shoes, bandages, adhesive tapes with gauze, etc.). Due to the porosity of the new material, it does not interfere with the desirable free exchange of gases or air.

To the many possible applications of the materials produced by the process of the present invention may be added, the use of such films, reinforced by the insertion of wires, for separating gases by diffusion or to finely distribute a certain quantity of gases passed through such films in liquids.

I claim:—

1. The method of producing chlor-rubber bodies having fine pores which comprises admixing a solution of chlor-rubber containing a solvent with a non-solvent of the group consisting of water, alcohols, aldehydes, carboxylic acids, phenols, glycerine esters, glycerine esters of phthalic acid, non-condensed linseed oil-phthalic acid-glyceride, decahydronaphthalene, condensed colophony, oil of turpentine and benzine, applying said solution to a surface, and permitting the volatile constituents to evaporate whereby a body of chlor-rubber is produced having fine pores capable of permitting the passage of air but preventing the passage of water.

2. The method of producing chlor-rubber bodies having microscopic pores which comprises introducing a solution of chlor-rubber containing a solvent into a mold, permitting the partial evaporation of the solvent from the solution to form a partially dried body, removing the partially dried body from the mold, and permitting substantially complete evaporation of the solvent whereby a body of chlor-rubber is produced having fine pores capable of permitting the passage of air but preventing the passage of water.

3. The method of producing chlor-rubber bodies having microscopic pores which comprises applying a solution of chlor-rubber containing a solvent to a surface, allowing the solvent to evaporate to produce a body of chlor-rubber, and stretching the said body whereby a body of chlor-rubber is produced having pores of a microscopic order.

FRANZ MIK.